United States Patent
Bartley et al.

(10) Patent No.: US 7,357,900 B2
(45) Date of Patent: *Apr. 15, 2008

(54) $NO_x$ REDUCTION SYSTEM FOR DIESEL ENGINES, USING HYDROGEN SELECTIVE CATALYTIC REDUCTION

(75) Inventors: Gordon James Johnston Bartley, San Anonio, TX (US); Christopher Alan Sharp, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 37 days.

This patent is subject to a terminal disclaimer.

(21) Appl. No.: 11/470,413

(22) Filed: Sep. 6, 2006

(65) Prior Publication Data

US 2007/0079600 A1   Apr. 12, 2007

Related U.S. Application Data

(63) Continuation of application No. 10/093,199, filed on Mar. 7, 2002, now Pat. No. 7,135,153.

(51) Int. Cl.
*B01D 50/00* (2006.01)
(52) U.S. Cl. .................................. 422/168
(58) Field of Classification Search ............ 422/171, 422/177, 180, 173; 431/5, 7, 170
See application file for complete search history.

(56) References Cited

U.S. PATENT DOCUMENTS

| | | | |
|---|---|---|---|
| 4,902,487 A | 2/1990 | Cooper et al. | 423/215.5 |
| 5,441,401 A | 8/1995 | Yamaguro et al. | 431/7 |
| 5,543,124 A | 8/1996 | Yokota et al. | 423/239.1 |
| 5,791,139 A | 8/1998 | Atago et al. | 60/274 |
| 5,849,593 A | 12/1998 | Schmelz | 436/55 |
| 6,122,909 A | 9/2000 | Murphy et al. | 60/286 |
| 6,145,501 A | 11/2000 | Manohar et al. | 431/170 |
| 6,182,443 B1 | 2/2001 | Jarvis et al. | 60/274 |
| 6,653,005 B1 | 11/2003 | Muradov | 429/19 |

FOREIGN PATENT DOCUMENTS

| | | |
|---|---|---|
| EP | 0 537 968 A1 | 4/1993 |
| EP | 1 094 206 A2 | 4/2001 |
| JP | 03195305 | 8/1991 |
| WO | 00/53903 | 9/2000 |

OTHER PUBLICATIONS

European Search Report for 03250770.9-231, 3 pages, Feb. 20, 2004.

(Continued)

*Primary Examiner*—Glenn Caldarola
*Assistant Examiner*—Tom Duong
(74) *Attorney, Agent, or Firm*—Baker Botts LLP

(57) ABSTRACT

An emission control system for reducing $NO_x$ in the exhaust of a diesel engine. A partial oxidation system receives diesel fuel from the engine's fuel tank and partially oxidizes the diesel fuel into hydrogen. The hydrogen is then introduced into the main exhaust line and the hydrogen-enhanced exhaust is delivered to a hydrogen selective catalytic reduction unit, which uses the hydrogen to convert the $NO_x$ to nitrogen.

19 Claims, 1 Drawing Sheet

OTHER PUBLICATIONS

Japanese Pending Patent Application entitled "Device for Measuring Amount of Hydrogen in Exhaust Gas and Exhaust Gas Emission Control System", by Hitoshi, et al.; Publication No. 2001-304031; English Abstract, filed Apr. 19, 2000.

Edgewater Products L.L.C.; "Watching your EGT's"; http:/www.fast-diesel.com/docs.egt.html; last accessed Jan. 20, 2006.

Hornung, A. et al.; "On the mechanism of the selective catalytic reduction of NO to $N_2$ by $H_2$ over Ru/MgO and Ru/$Al_2O_3$ catalysts"; Topics in Catalysis 11/12 (2000): pp. 263-270.

NO$_x$ REDUCTION SYSTEM FOR DIESEL ENGINES, USING HYDROGEN SELECTIVE CATALYTIC REDUCTION

RELATED APPLICATION

This application is a continuation of U.S. patent application Ser. No. 10/093,199 filed Mar. 7, 2002, now U.S Pat. No. 7,135,153 the contents of which is hereby incorporated in its entirety by reference.

TECHNICAL FIELD OF THE INVENTION

This invention relates to emission reduction systems for diesel engines, and more particularly to nitrogen oxide reduction using a hydrogen-selective catalytic reduction catalyst.

BACKGROUND OF THE INVENTION

In an effort to reduce ambient levels of air pollution in the United States, the United States Environmental Protection Agency (EPA) has proposed a tightening of the emissions standards for heavy-duty diesel engines. This proposal includes measures for reducing the allowable sulfur content of diesel fuel. The proposal aims to lower emissions by about 95 percent, with nitrogen oxides (NO$_x$) and particulate matter (PM) emission standards of 0.2 and 0.01 gram per brake horsepower hour, respectively.

Existing aftertreatment technologies for achieving these goals include both PM reduction systems and NO$_x$ reduction systems. For PM reduction, existing technologies include a continuously regenerating trap (CRT®) and catalyzed traps. The term "CRT®" refers specifically to the particulate filter manufactured by Johnson Matthey of London, United Kingdom, described in U.S. Pat. No. 4,902,487. For NO$_x$ reduction, existing technologies include selective catalytic reduction (SCR) systems that use urea as the reductant, and NO$_x$ storage catalysts.

Various factors determine which aftertreatment technology is most suitable for diesel engine exhaust. One consideration is the effect of the sulfur content in the diesel fuel. Sulfur increases the regenerating temperature of a CRT, which adversely affects its performance. Sulfur is also a poison for NO$_x$ traps. Because of the negative effects of sulfur on aftertreatment performance, the EPA is recommending a diesel fuel sulfur cap of 15 ppm.

However, evidence implies that 15 ppm may still be too high for NO$_x$ traps to be effective. As a result, urea SCR systems may be a more effective method for adequate NO$_x$ reduction.

Despite their effectiveness, urea SCR systems are not without their shortcomings. Urea SCR is based on ammonia reduction, with urea being the reductant of choice for vehicular applications, due to the perception that a supply of ammonia on-board a vehicle would be unsafe. Ammonia is considered to be highly toxic, whereas urea is only mildly toxic. But the problem with urea SCR is that a separate supply of urea is required on-board. Not only does this requirement call for a separate storage tank, but the urea must be replenished periodically and there is no infrastructure to provide a nationwide supply. Also, the system required to introduce urea into the exhaust stream is complex. In sum, there are many issues affecting the practicality of using urea for SCR.

DETAILED DESCRIPTION OF THE INVENTION

The invention described herein is directed to an SCR system that does not require urea as the reductant. The system uses diesel fuel instead of urea, which eliminates the requirement for a second supply tank and the need for a urea supply infrastructure.

Figure 1:
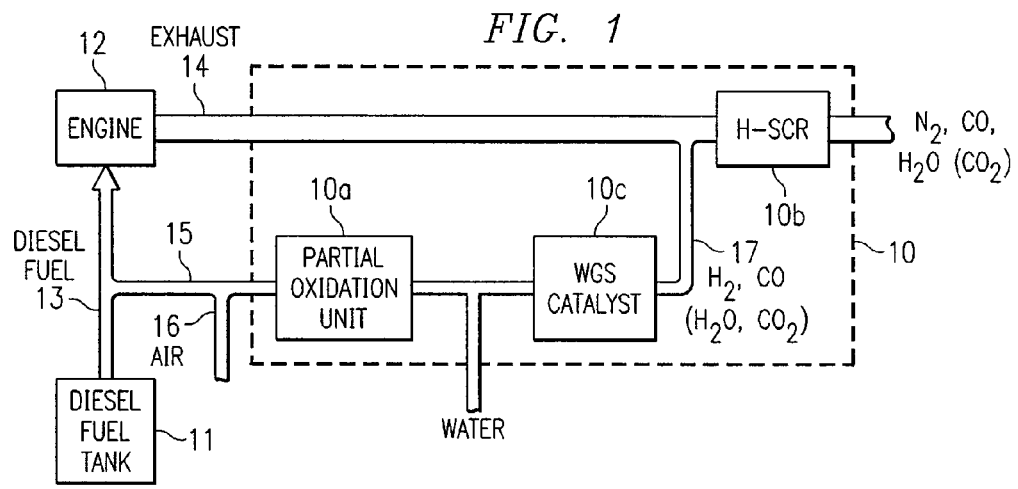
FIG. 1 is a block diagram of a first embodiment of the invention.
Figure 2:
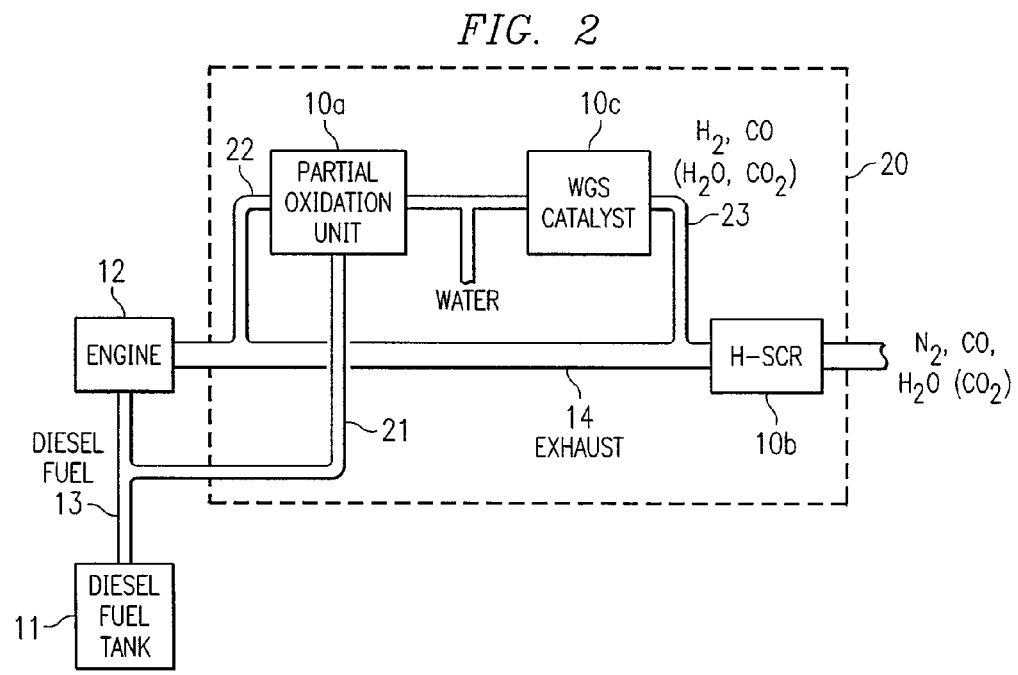
FIG. 2, is a block diagram of a second embodiment of the invention.

FIGS. 1 and 2 describe two different embodiments of the invention. Both use an oxidation unit 10a and a hydrogen selective catalytic reduction (H-SCR) unit 10b, but in different configurations. Both embodiments are used with diesel engines, which do not run rich. The oxidation unit 10a acts as a hydrogen generator, and runs "offline" of the main exhaust gas stream so that it may operate in a rich fuel environment. The hydrogen from oxidation unit 10a is fed to the H-SCR catalyst 10b, which continuously converts NO$_x$ to N$_2$ and H$_2$O. An optional water gas shift (WGS) catalyst 10c may be interposed between the partial oxidation unit 10a and the H-SCR catalyst 10b, to generate additional hydrogen.

As explained below, diesel fuel is partially oxidized by oxidation unit 10b to produce a combination of hydrogen (H$_2$) and carbon monoxide (CO), with traces of carbon dioxide (CO$_2$) and water (H$_2$O) produced as by products. The hydrogen is then used by an H-SCR catalyst 10b to convert the NO$_x$ in the exhaust stream into nitrogen. The H-SCR catalyst 10b is selected specifically to use hydrogen to reduce exhaust-borne NO$_x$ emissions, and operates under net oxidizing conditions (lambda>1).

FIG. 1 illustrates one embodiment of an H-SCR (hydrogen SCR) system 10 in accordance with the invention. Partial oxidation unit 10a receives a fraction of the diesel fuel, relative to the fuel flow to engine 12, from tank 11. Partial oxidation unit 10a may be any type of catalyst or non-stoichiometric burner, suitable for partial oxidation of hydrocarbons. In general, partial oxidation unit 10a operates by converting diesel fuel into a gas mixture containing hydrogen as one of its primary components. In the embodiment of FIG. 1, partial oxidation unit 10a receives diesel fuel from an auxiliary fuel line 15 off the main fuel line 13 and air from an air input line 16. An output line 17 delivers the gas mixture to the main exhaust line 14.

Partial oxidation catalysts exist that can convert hydrocarbons with conversion efficiency greater than 90 percent and selectivity to hydrogen in excess of 90 percent. Certain catalysts have already been proven effective at converting natural gas to hydrogen, namely nickel-based and rhodium-based formulations. These include Ni/Al$_2$O$_3$, Ni/La/Al$_2$O$_3$, and Rh/Al$_2$O$_3$. Although nickel-based catalysts may produce carbon, they are less expensive than rhodium-based catalysts.

Catalytic partial oxidation is a high space velocity process (e.g., 500,000 per hour), with residence times typically in the range of 10 to 1000 microseconds. Thus, the catalysts do not need to be large to have high efficiency and selectivity. Partial oxidation catalysts operate under reducing gas conditions, and the lambda in the partial oxidizer may be about 0.3 to 0.6.

In the embodiment of FIG. 1, an optional WGS catalyst 10c is interposed directly downstream of the partial oxidation unit 10a and upstream of H-SCR catalyst 10b. WGS catalyst 10c uses carbon monoxide (CO) generated by the partial oxidation unit 10a to form additional hydrogen. To enable this reaction, supplemental water may be added to the gas mixture entering WGS catalyst 10c. An advantage of using WGS catalyst 10c is that more hydrogen can be produced from the same amount of fuel. In other words, less fuel is needed to generate the same amount of hydrogen.

The gas mixture from WGS catalyst 10c is injected into the main diesel exhaust line 14, upstream of H-SCR catalyst 10b. In embodiments not having WGS catalyst 10c, the gas mixture from partial oxidation unit 10a would be injected into the main exhaust line 14 at the same point. In all embodiments, H-SCR catalyst 10b then uses the hydrogen in the gas mixture to convert $NO_x$ into nitrogen and water.

FIG. 2 illustrates a second embodiment of the invention, an H-SCR system 20, whose partial oxidation unit 10a is positioned on a branch line 22 off the main exhaust line. The partial oxidation unit 10a receives a portion of the exhaust diverted from the exhaust line, as well as diesel fuel from an auxiliary fuel line 21. Under net reducing conditions, diesel fuel is converted into hydrogen, carbon monoxide and traces of carbon dioxide and water. Like system 10, system 20 may have an optional WGS catalyst 10c downstream of the partial oxidation unit 10a. The hydrogen-enhanced gas mixture flows back into the main exhaust line, via an output branch line 23, upstream of an H-SCR catalyst 10b, which uses the hydrogen to convert $NO_x$ into nitrogen and water.

For system 20, effective partial oxidation is achieved by controlling the diesel injection rate. When no supplemental diesel fuel is being injected into the exhaust stream, such as when $NO_x$ emissions from engine 12 are low, the partial oxidation unit 10a acts as a full oxidation catalyst, converting unburned hydrocarbons and carbon monoxide into water and carbon dioxide. With the partial oxidation unit 10a located in a branch off the main exhaust gas stream, a portion of the exhaust flows through the partial oxidation catalyst. As a result, less diesel fuel is required to enrich the gas entering the partial oxidation catalyst. Also, the partial oxidation catalyst can be smaller. At the same time, sufficient hydrogen must be generated to obtain effective reduction of the $NO_x$ in the H-SCR catalyst 10b. This design has the advantages that the heat required to activate the partial oxidation catalyst may be provided by the exhaust gas instead of by an external heat source, and it may be possible to use the heat generated by the partial oxidation reaction to accelerate heating of the H-SCR catalyst 10b during cold-start operation.

For both system 10 and system 20, the products of partial oxidizer 10a are metered into the diesel exhaust gas, upstream of H-SCR catalyst 10b. The amount of gas injected should ideally be proportional to the amount of $NO_x$ in the exhaust. A 1:1 molar ratio of $H_2$:NO is expected for efficient conversion of NO to $N_2$ in accordance with Equation (1) below. However, $NO_2$ exists in the diesel exhaust simultaneously with NO, either from the combustion process (approximately 15 percent) or from oxidation in a passive particulate trap such as a CRT (approximately 40 percent). A 2:1 ratio of $H_2$:$NO_2$ is expected for efficient conversion of $NO_2$ to $N_2$ in accordance with Equation (2) below.

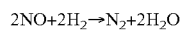

$$2NO+2H_2 \rightarrow N_2+2H_2O \qquad \text{Equation (1)}$$

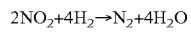

$$2NO_2+4H_2 \rightarrow N_2+4H_2O \qquad \text{Equation (2)}$$

Results of experimentation with ruthenium-based H-SCR catalysts using Ru/MgO and Ru/Al$_2$O$_3$ have been reported by Hornung, et al. in a paper entitled "On the mechanism of the selective catalytic reduction of NO to $N_2$ by $H_2$ over Ru/MgO and Ru/Al$_2$O$_3$ catalysts", in *Topics in Catalysis*, 2000, 11/12 (1-4), 263-70. The reports are of 100 percent selectivity to $N_2$. Another possible candidate for H-SCR catalyst 10b is a platinum titania-zirconia catalyst, Pt/TiO$_2$—ZrO$_2$.

Potential fuel penalties may be calculated based on the NO:$NO_2$ ratio in the exhaust. If a range of $NO_2$ content is considered from 15 to 100 percent, the fuel economy penalty is calculated to be in a range from two to four percent. To estimate a realistic fuel economy penalty, a worst case scenario was used with a system containing a passive PM trap, such as a CRT, which creates high levels of $NO_2$. Based on a 60:40 NO:$NO_2$ exhaust gas mixture, and using Equations (1) and (2), approximately 1.4 moles of $H_2$ are required per mole of $NO_x$. Assuming ideal conditions of 100 percent efficient partial oxidation, 100 percent selectivity to $H_2$, and 100 percent $NO_x$ conversion efficiency of the H-SCR catalyst, it was calculated that fuel economy would be reduced by 2.5 percent.

An advantage of the invention is that the invention effectively reduces tailpipe oxides of nitrogen emissions without the need for a reductant other than diesel fuel. It continuously converts $NO_x$ to nitrogen, by first generating hydrogen from the diesel fuel and then using the hydrogen in a hydrogen-based SCR catalyst. The system does not require adjustment of the engine air/fuel ratio, of engine combustion, or of any other engine functionality.

Other Embodiments

Although the present invention has been described in detail, it should be understood that various changes, substitutions, and alterations can be made hereto without departing from the spirit and scope of the invention as defined by the appended claims.

What is claimed is:

1. A system for treating $NO_x$ emissions from a diesel engine that has at least one internal combustion chamber for combusting diesel fuel and has a main exhaust line that carries exhaust from the engine, the exhaust having a range of exhaust gas temperatures typical for a vehicular diesel engine, the system comprising:

an auxiliary fuel line from the engine's diesel fuel supply source, separate from the main fuel supply line to the engine;

a partial oxidation unit located on the auxiliary fuel line, external to the internal combustion chamber and off-line the main exhaust line;

an air intake line for delivering air to the partial oxidation unit;

an output line for delivering a hydrogen-enhanced gas mixture from the partial oxidation unit to the main exhaust line;

wherein the partial oxidation unit is operable to receive air via the air intake line, to receive diesel fuel via the auxiliary fuel line, and to at least partially oxidize the fuel to produce the hydrogen-enhanced gas mixture; and a ruthenium-based hydrogen selective catalytic reduction (H-SCR) unit, located in-line on the main exhaust line, operable to receive the hydrogen-enhanced gas mixture from the partial oxidation unit, and to use hydrogen in the hydrogen-enhanced gas mixture to continuously reduce $NO_x$ emissions in the exhaust line to nitrogen;

wherein the H-SCR unit is further operable to reduce the $NO_x$ emissions to nitrogen under the range of exhaust gas temperatures;

means for determining the amounts of NO and $NO_2$ in the exhaust gas; and a metering device on the output line for maintaining a ratio of the hydrogen to $NO_x$ in the main exhaust line, on the basis of a desired ratio of the hydrogen to NO and a desired ratio of the hydrogen to $NO_2$.

2. The system of claim 1, wherein the partial oxidation unit is a non-stoichiometric burner.

3. The system of claim 1, wherein the partial oxidation unit has a catalyst.

4. The system of claim 3, wherein the partial oxidation unit is a nickel-based catalyst.

5. The system of claim 3, wherein the partial oxidation unit is a rhodium-based catalyst.

6. The system of claim 1, wherein the partial oxidation unit is a combination of a non-stoichiometric burner and a catalyst.

7. The system of claim 1, further comprising a water gas shift catalyst downstream of the partial oxidation unit and upstream the catalytic unit, operable to generate further hydrogen from the gas mixture.

8. The system of claim 1, wherein the H-SCR unit comprises ruthenium and magnesium.

9. The system of claim 1, wherein the H-SCR unit comprises ruthenium and aluminum.

10. A system for treating $NO_x$ emissions from a diesel engine that has at least one internal combustion chamber for combusting diesel fuel and has a main exhaust line that carries exhaust from the engine, the exhaust having a range of exhaust gas temperatures typical for a vehicular diesel engine, the system comprising:

an auxiliary fuel line from the engine's diesel fuel supply source, separate from the main fuel supply line to the engine;

a partial oxidation unit located on the auxiliary fuel line, external to the internal combustion chamber and off-line the main exhaust line;

an exhaust gas intake line for delivering a portion of the engine exhaust gas from the main exhaust line to the partial oxidation unit;

an output line for delivering a hydrogen-enhanced gas mixture from the partial oxidation unit to the main exhaust line, downstream the exhaust gas intake line;

wherein the partial oxidation unit is operable to receive the portion of the engine exhaust via the exhaust gas intake line, to receive diesel fuel via the auxiliary fuel line, and to at least partially oxidize the fuel to produce the hydrogen-enhanced gas mixture;

a ruthenium-based hydrogen selective catalytic reduction unit, located in-line on the main exhaust line operable to receive the hydrogen-enhanced gas mixture from the partial oxidation unit, and to use hydrogen in the hydrogen-enhanced gas mixture to continuously convert the $NO_x$ emissions in the exhaust line to nitrogen;

wherein the H-SCR unit is further operable to reduce the $NO_x$ emissions to nitrogen under the range of exhaust gas temperatures;

means for determining the amounts of NO and $NO_2$ in the exhaust gas; and a metering device on the output line for maintaining a ratio of the hydrogen to $NO_x$ in the main exhaust line, on the basis of a desired ratio of the hydrogen to NO and a desired ratio of the hydrogen to $NO_2$.

11. The system of claim 10, wherein the partial oxidation unit is a non-stoichiometric burner.

12. The system of claim 10, wherein the partial oxidation unit is a catalyst.

13. The system of claim 10, wherein the partial oxidation unit is a nickel-based catalyst.

14. The system of claim 10, wherein the partial oxidation unit is a rhodium-based catalyst.

15. The system of claim 10, wherein the partial oxidation unit is a combination of a non-stoichiometric burner and a catalyst.

16. The system of claim 10, further comprising a water gas shift catalyst downstream of the partial oxidation unit and upstream the catalytic unit, operable to generate further hydrogen from the gas mixture.

17. The system of claim 10, wherein the H-SCR unit comprises ruthenium and magnesium.

18. The system of claim 10, wherein the H-SCR unit comprises ruthenium and aluminum.

19. The system of claim 10, wherein the exhaust gas intake line is a bypass line off the main exhaust line.

* * * * *